(12) United States Patent
Uekita

(10) Patent No.: US 11,579,123 B2
(45) Date of Patent: Feb. 14, 2023

(54) ROTATING MACHINE ABNORMALITY DETECTION DEVICE AND ROTATING MACHINE ABNORMALITY DETECTION METHOD

(71) Applicant: KABUSHIKI KAISHA TOSHIBA, Tokyo (JP)

(72) Inventor: Masahiro Uekita, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/390,243

(22) Filed: Jul. 30, 2021

(65) Prior Publication Data

US 2022/0091070 A1 Mar. 24, 2022

(30) Foreign Application Priority Data

Sep. 24, 2020 (JP) .............................. JP2020-159490

(51) Int. Cl.
  *G01N 29/14* (2006.01)
  *G01N 29/44* (2006.01)
  *G01N 29/24* (2006.01)
(52) U.S. Cl.
  CPC .......... *G01N 29/14* (2013.01); *G01N 29/2418* (2013.01); *G01N 29/44* (2013.01)
(58) Field of Classification Search
  CPC .... G01N 29/14; G01N 29/2418; G01N 29/44; G01N 29/42; G01N 29/4427; G01N 29/46
  See application file for complete search history.

(56) References Cited

U.S. PATENT DOCUMENTS

| 2002/0194915 A1* | 12/2002 | Abdel-Malek ......... G01N 29/14 73/587 |
| 2017/0212085 A1 | 7/2017 | Kajita et al. |
| 2018/0202577 A1* | 7/2018 | Widl ....................... G01M 3/24 |
| 2019/0178705 A1* | 6/2019 | Kishi ....................... G01H 3/08 |

FOREIGN PATENT DOCUMENTS

| JP | 2008-107294 A | 5/2008 |
| JP | 2016-205956 A | 12/2016 |
| JP | 2017-032467 A | 2/2017 |
| JP | 6251658 B2 | 12/2017 |
| JP | 6508017 B2 | 5/2019 |
| WO | WO202118228 A1 * | 9/2021 |

* cited by examiner

*Primary Examiner* — Natalie Huls
*Assistant Examiner* — Cynthia L Davis
(74) *Attorney, Agent, or Firm* — Maier & Maier, PLLC

(57) ABSTRACT

A rotating machine abnormality detection device of an embodiment includes a non-contact acoustic emission sensor, an analyzer, and a diagnoser. The non-contact acoustic emission sensor, arranged at a position spaced away by a predetermined distance from a measurement target acting as a rotating member or a measurement target rotatably supporting the rotating member, is configured to detect acoustic emission that occurs during rotation of the measurement target or the rotating member supported by the measurement target and propagates in an atmosphere. The analyzer is configured to perform time-frequency analysis on a detection signal of the non-contact acoustic emission sensor. The diagnoser is configured to detect occurrence of a rotation abnormality when a frequency component equal to or larger than a predetermined threshold value is present in a predetermined frequency band, based on an analysis result of the analyzer.

3 Claims, 6 Drawing Sheets

ROTATING MACHINE ABNORMALITY DETECTION DEVICE AND ROTATING MACHINE ABNORMALITY DETECTION METHOD

CROSS-REFERENCE TO RELATED APPLICATIONS

This application is based upon and claims the benefit of priority from Japanese Patent Application No. 2020-159490, filed on Sep. 24, 2020, the entire contents of which are incorporated herein by reference.

FIELD

Embodiments described herein relate generally to a rotating machine abnormality detection device and a rotating machine abnormality detection method.

BACKGROUND

Conventionally, an electromechanical transducer element that includes material such as piezoelectric ceramics to convert mechanical energy of vibration into electrical energy has been used as a sensor that detects an abnormality (for example, abnormal vibration) of a rotating machine, for example.

In this case, the electromechanical transducer element employs a contact AE sensor, an acceleration sensor, or the like. The contact AE sensor detects acoustic emission (AE), which is an elastic wave phenomenon caused by the occurrence of a micro-fracture in an object to be measured during rotation.

For example, a milling spindle etc. of a machine tool rotates at high speed up to several tens of thousands of rotations per minute, and the contact AE sensor or the acceleration sensor is used to predict the state of a bearing.

These sensors are used in a state where a detection surface is in contact with or fixed to a housing etc. of the bearing. In particular, the contact AE sensor performs detection for a foreign matter biting abnormality, a micro-crack, and the like, which are starting points of failure of bearing components.

However, the conventional contact AE sensor or acceleration sensor cannot achieve sufficient detection sensitivity for sound or the like caused by insufficient lubrication (gnawing or burn-in) or the like on the surface of a rotating shaft or a bearing material, and cannot detect a rotation abnormality.

DETAILED DESCRIPTION

According to one embodiment, a rotating machine abnormality detection device includes a non-contact acoustic emission sensor, an analyzer, and a diagnoser. The non-contact acoustic emission sensor, arranged at a position spaced away by a predetermined distance from a measurement target acting as a rotating member or a measurement target rotatably supporting the rotating member, is configured to detect acoustic emission that occurs during rotation of the measurement target or the rotating member supported by the measurement target and propagates in an atmosphere. The analyzer is configured to perform time-frequency analysis on a detection signal of the non-contact acoustic emission sensor. The diagnoser is configured to detect occurrence of a rotation abnormality when a frequency component equal to or larger than a predetermined threshold value is present in a predetermined frequency band, based on an analysis result of the analyzer.

Figure 1:
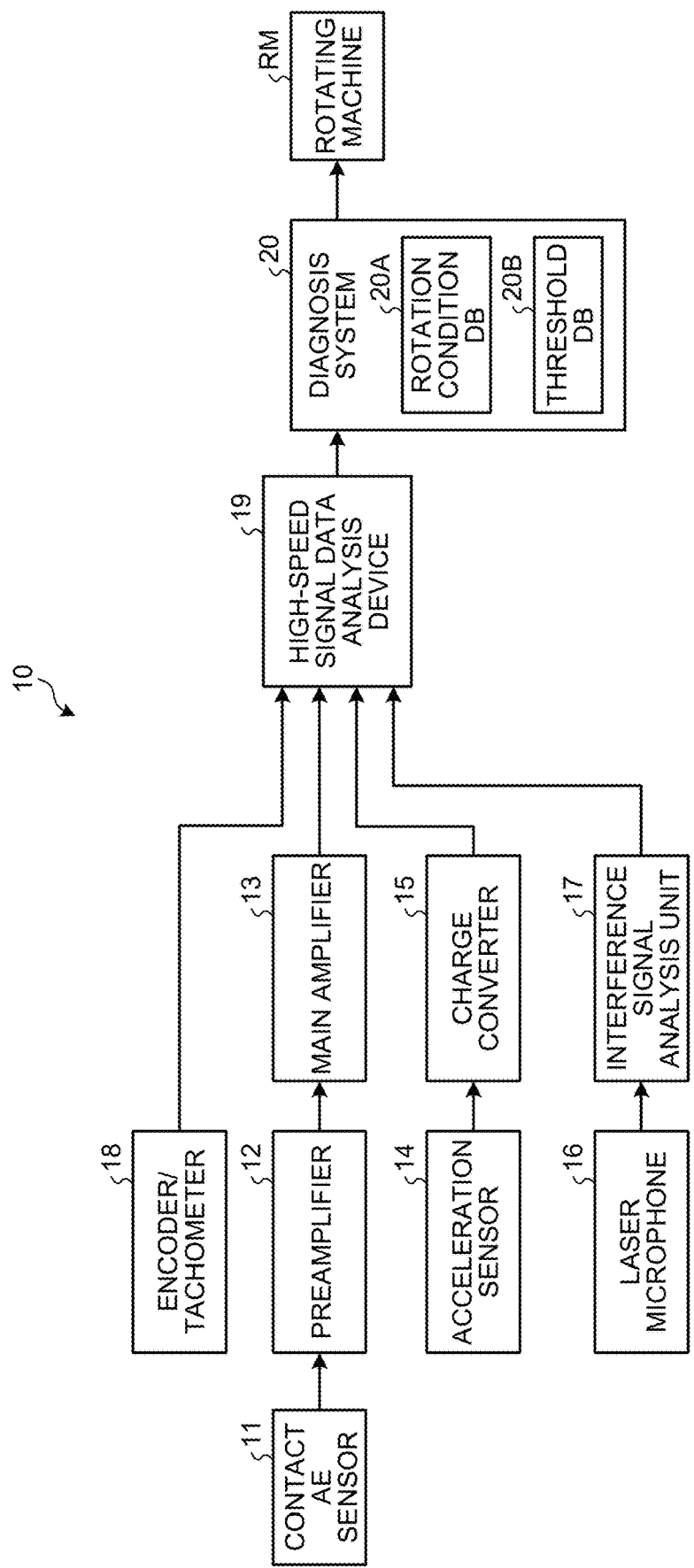
FIG. 1 is a schematic configuration block diagram illustrating a rotating machine abnormality detection system.

FIG. 1 is a schematic configuration block diagram illustrating a rotating machine abnormality detection system.

In the following description, the rotating machine is defined to include a machine that rotates about an axis, such as an electric motor or a turbine, a rotating processing device including the machine, and the like.

A rotating machine abnormality detection system 10 includes a contact AE sensor 11, a preamplifier 12 that amplifies the voltage of an output signal of the contact AE sensor 11, a main amplifier 13 that amplifies the power of an output signal of the preamplifier 12, an acceleration sensor 14, a charge converter 15, a laser microphone 16 that collects sound using the principle of a Fabry-Perot interferometer, an interference signal analysis unit 17 that analyzes an output signal of the laser microphone 16, an encoder/tachometer 18 that detects the operation timing of a rotating machine RM, a high-speed signal data analysis device (analyzer) 19 that performs data analysis (real-time frequency analysis) on a high-speed signal on the basis of an output signal of the main amplifier 13, an output signal of the charge converter 15, an output signal of the interference signal analysis unit 17, and an output signal of the encoder/tachometer 18 to extract a feature amount, and a diagnosis system (diagnoser) 20 that refers to a rotation condition database 20A and a threshold database 20B on the basis of the feature amount extracted by the high-speed signal data analysis device 19 to generate and output a control command of the rotating machine RM for the control of the rotating machine RM, and that detects occurrence of an abnormality when a frequency component equal to or larger than a predetermined threshold value is present in a predetermined frequency band.

Figure 2:
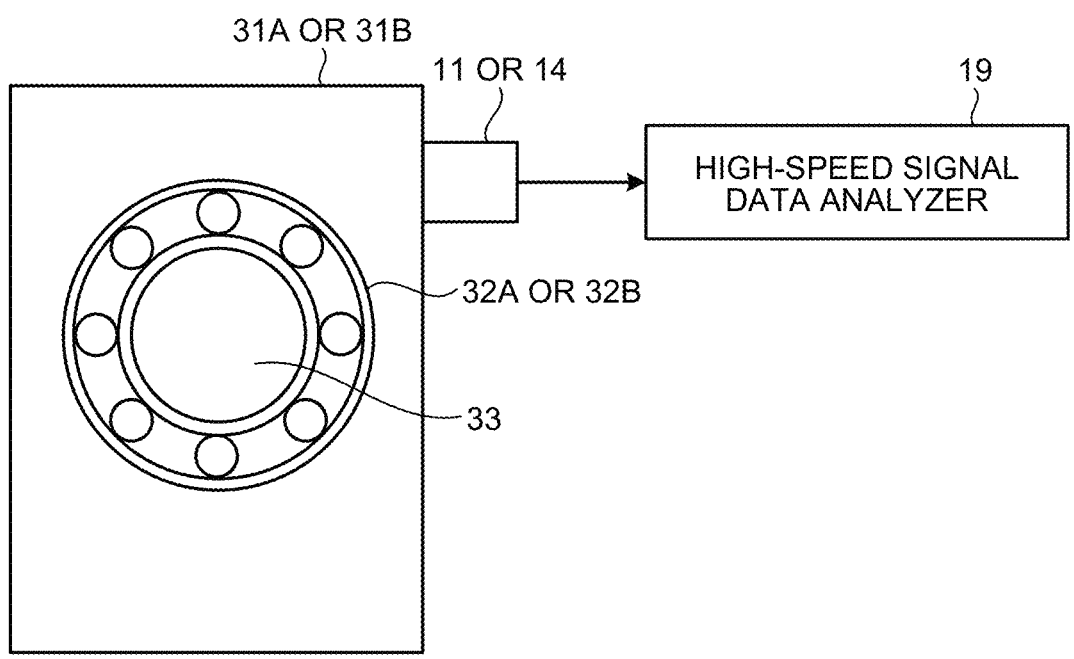
FIG. 2 is an explanatory diagram illustrating a main part of a rotating machine to which the rotating machine abnormality detection system is applied.

FIG. 2 is an explanatory diagram illustrating a main part of a rotating machine to which the rotating machine abnormality detection system is applied.

In a rotating machine, the rotation speed (times/minute) is set in view of a motor, a gear configuration, and the like.

The actual rotation speed of the rotating machine can be grasped by the encoder/tachometer 18.

For example, a milling spindle of a rotating machine tool or the like rotates at high speed up to several tens of thousands of rotations/minute, and the AE sensor and the acceleration sensor are used to predict the state of a bearing.

These sensors (the contact AE sensor 11 and the acceleration sensor 14) are used in a state where the detection surfaces are in contact with and fixed to a housing 31A, 31B of the bearing as illustrated in FIG. 2.

In this case, the contact AE sensor 11 is intended to detect abnormalities such as foreign matter biting and micro-cracks, which are starting points of failure of the bearings 32A and 32B.

The contact AE sensor 11 captures a phenomenon such as a foreign matter biting abnormality or an occurrence of a micro-crack, and outputs a detection signal to the preamplifier 12.

The preamplifier 12 amplifies the voltage of the detection signal output from the contact AE sensor 11 and outputs the amplified voltage signal to the main amplifier 13.

The main amplifier 13 amplifies the power of the amplified voltage signal and outputs the amplified signal to the high-speed signal data analysis device 19.

The acceleration sensor 14 can be used when an abnormality detectable by the contact AE sensor described above occurs in a wider range (captures large energy), and outputs a detection signal to the charge converter 15. More specifically, the acceleration sensor 14 is configured as a charge output type acceleration sensor, and outputs a detection signal proportional to the applied acceleration to the charge converter.

The signal is amplified by the charge converter 15 and output to the high-speed signal data analysis device 19.

Figure 3:
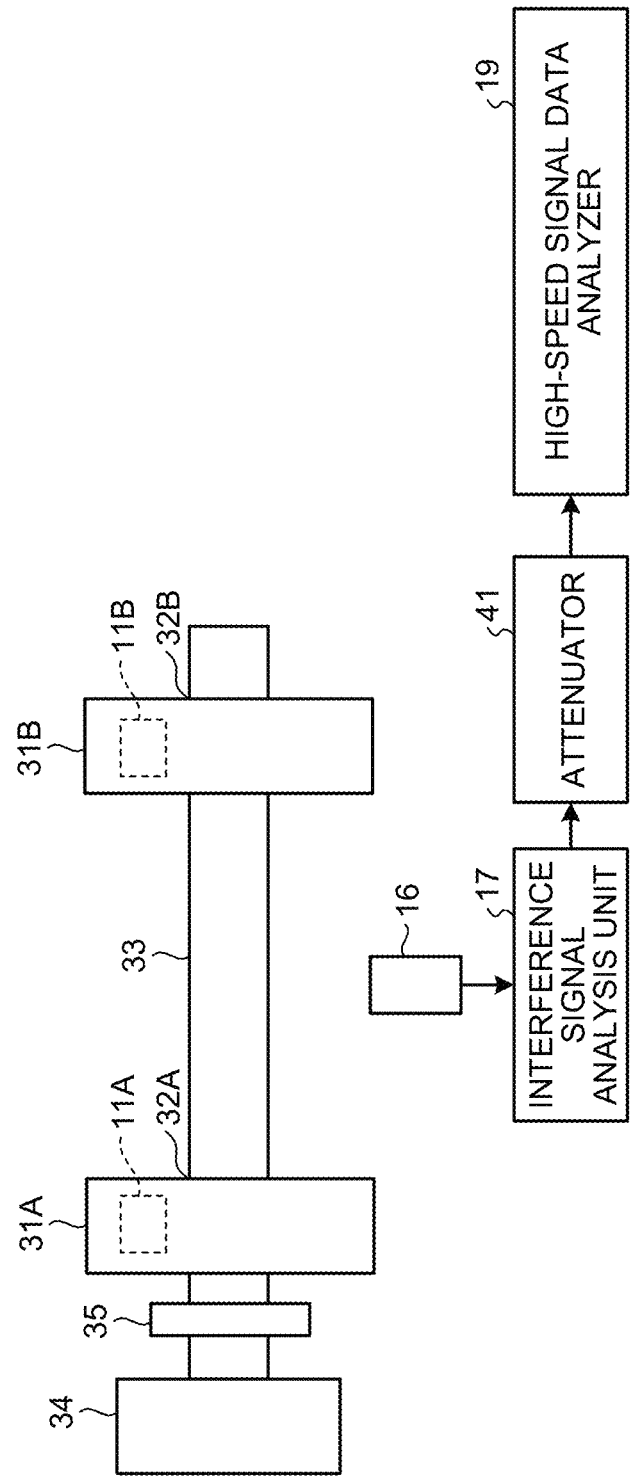
FIG. 3 is an explanatory diagram illustrating an application example of a laser microphone.

FIG. 3 is an explanatory diagram illustrating an application example of a laser microphone.

In the present embodiment, a rotating shaft 33 is rotatably supported by the bearings 32A and 32B supported by the housings 31A and 31B.

Further, the rotating shaft 33 is rotatably driven by being connected to a motor 34 via a coupling 35.

In this state, the laser microphone 16, which is a non-contact AE sensor, is installed with a predetermined distance from the rotating shaft 33, and captures a phenomenon in which sufficient detection sensitivity cannot be obtained by the contact AE sensor 11 (11A, 11B) or the acceleration sensor 14, such as sound due to insufficient lubrication (gnawing or burn-in) or the like on the material surface of the rotating shaft 33 as a sound wave (an elastic wave) propagating in the atmosphere.

The laser microphone 16 then captures the phenomenon in which sufficient detection sensitivity cannot be obtained by the contact AE sensor 11 or the acceleration sensor 14, such as insufficient lubrication (gnawing or burn-in) on the material surface of the rotating shaft 33 as sound propagating in the atmosphere, and outputs a detection signal to the interference signal analysis unit 17.

The interference signal analysis unit 17 analyzes an output signal of the laser microphone 16, attenuates the signal through an attenuator 41, and then outputs the signal to the high-speed signal data analysis device 19.

The high-speed signal data analysis device 19 performs data analysis (real-time frequency analysis) on a high-speed signal on the basis of an output signal of the interference signal analysis unit 17 and an output signal of the encoder/tachometer 18, and extracts a feature amount.

In this case, the high-speed signal data analysis device 19 has an A/D converter that performs analog/digital conversion, and includes a frequency filter function, a real-time frequency analysis function, and the like.

The frequency band of the contact AE sensor 11 described above is about several 10 kHz to 1 MHz.

In addition, the frequency band of the acceleration sensor 14 is about 0 to 20 kHz.

Furthermore, the frequency band of the laser microphone 16 is about 10 Hz to 1 MHz.

On the other hand, the frequency of AE related to the fracture phenomenon of a metal material is said to be about several 10 kHz to 1 MHz, and it is also known that the frequency and amplitude intensity of the AE vary depending on the phenomenon.

In addition, in abrasive wear that occurs when the tool is used for a long period of time, AE appears with a relatively small amplitude between 0.25 to 1 MHz.

Moreover, in strong adhesion wear in which sliding friction surfaces are brought into contact and fused with each other to be burnt, AE occurs with a large amplitude at a high frequency of 1 to 1.5 MHz.

As described above, the frequency of acoustic emission is much higher than the frequency of mechanical vibration and noise in the surrounding environment=0 to 1 kHz, and if an appropriate filtering process is performed on the original signal, information related to tool wear and fracture can be obtained.

Moreover, the encoder/tachometer 18 also detects the rotational position of the rotating shaft 33.

In addition, the laser microphone 16 of the present embodiment can detect sounds of different frequencies (up to about 1 MHz) generated according to the processing/fracture phenomenon of the metal material. AE parameters (a maximum amplitude, energy, an RMS amplitude, an AE count value, and the like) in time intervals on the order of milliseconds are typically used, but detailed frequency information is lost.

Consequently, the high-speed signal data analysis device 19 of the present embodiment includes the frequency filter function for the original signal and the real-time frequency analysis function as described above, and can estimate the cause of occurrence of the phenomenon.

The diagnosis system 20 includes the rotation condition database (DB) 20A for referring to the rotation conditions of the rotating machine RM and the threshold database (DB) 20B for referring to a determination threshold.

Then, if a frequency component equal to or larger than a predetermined threshold value is present in a predetermined frequency band, the diagnosis system 20 detects that a rotation abnormality has occurred and executes corresponding control.

Note that, instead of or in addition to the rotation condition database 20A and the threshold database 20B, a function of estimating a state from a model that has learned data collected in real time may be provided.

Further, it is desirable to appropriately select a control command to the rotating machine RM in a case where an abnormality (a defect) is detected by the diagnosis system 20 according to the quality standard and rotation speed of a target process, and the like.

Figure 4:
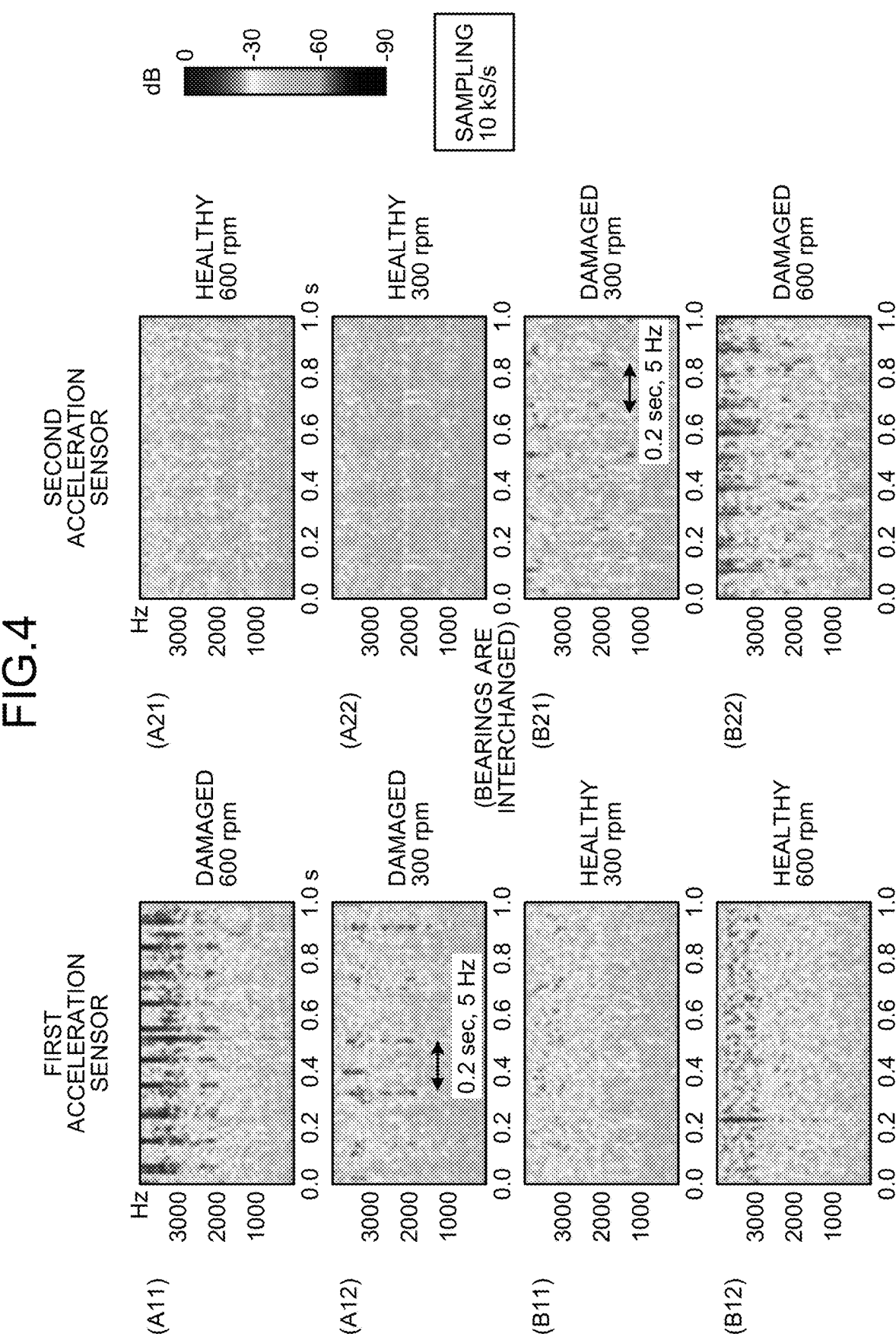
FIG. 4 is an explanatory diagram illustrating a specific example of abnormality detection.

FIG. 4 is an explanatory diagram illustrating a specific example of abnormality detection.

FIG. 4 illustrates, as an example, a signal of a bearing with an acceleration sensor with a band of up to 5 kHz.

Among the two bearings 32A and 32B supporting the rotating shaft 33, one (see A11, A12, B21, B22) is an abnormal bearing (Damaged) that is intentionally damaged in advance and the other (see A21, A22, B11, B12) is a normal bearing (Healthy), and signals of these two bearings are compared.

In this case, as illustrated in FIG. 2, the acceleration sensor 14 is fixed to the housings 31A and 31B of the bearings 32A and 32B.

Further, FIG. 4 illustrates the time-frequency map for one second during the rotation of the rotating shaft 33, in which the sampling frequency of a signal is 10 kHz.

As illustrated in FIG. 4, a periodic spike signal can be found in the damaged bearing. Furthermore, it can be seen that the frequency of the spike proportionally increases according to a change in the rotation speed (300 rpm, 600 rpm).

This tendency holds true when the positional relationship of the bearings 32A and 32B in FIG. 2 from the motor 34 is interchanged.

As described above, it is important in the damaged bearing to grasp the occurrence frequency of spikes for each rotation speed, and a method of applying envelope processing or the like to a signal is known.

This holds true when the piezoelectric AE sensor is used, and the laser microphone 16, which is a contact AE sensor or a non-contact AE sensor, is used for the purpose of detecting a sign of initial damage of smaller energy as compared with the acceleration sensor 14.

Figure 5:
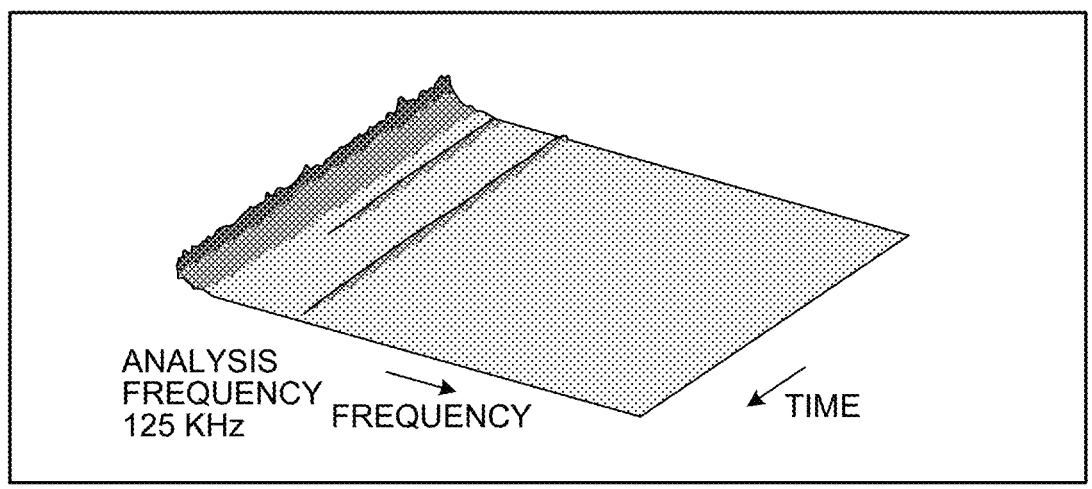
FIG. 5 is an explanatory diagram illustrating an example in which noise sound in a laboratory is measured in a state where the rotating machine is stopped when a signal of the rotating machine is acquired by using the laser microphone.

FIG. 5 is an explanatory diagram illustrating an example in which noise sound in a laboratory is measured in a state where a rotating machine is stopped when a signal of the rotating machine is acquired by using a laser microphone.

Figure 6A:
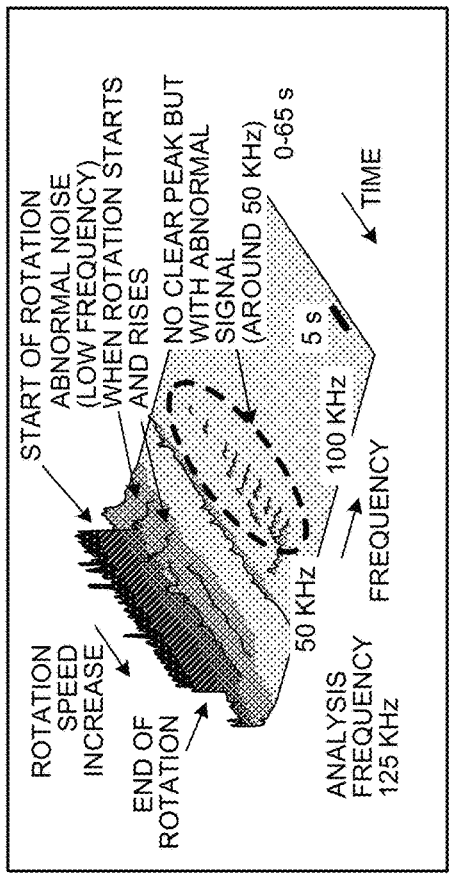
FIGS. 6A and 6B are diagrams illustrating measurement results in a state where the rotating machine is rotating when a signal of the rotating machine is acquired by using the laser microphone.
Figure 6B:
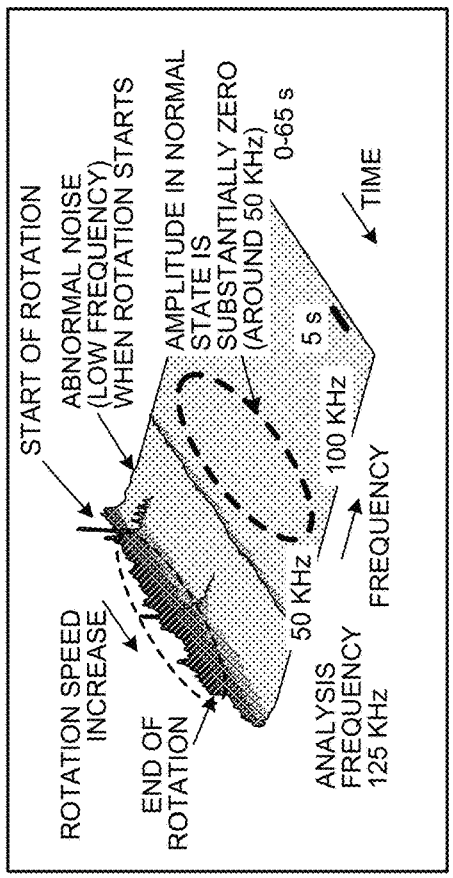

In addition, FIGS. 6A and 6B are diagrams illustrating measurement results in a state where the rotating machine is rotating when a signal of the rotating machine is acquired by using the laser microphone.

When both the bearings 32A and 32B are normal products, as illustrated in FIG. 6A, the amplitude around 50 kHz is substantially zero.

On the other hand, when the bearing A is replaced with a damaged bearing, it can be seen that acoustic energy is generated around 50 kHz as indicated by a broken line ellipse in FIG. 6B.

This phenomenon keeps a similar tendency when the rotation speed is changed (600, 900, 1200, 1500, 1800 rpm).

For this reason, in a case where a rotating element is damaged, it is considered that high-frequency sound is generated to reach the laser microphone 16 by propagation in the atmosphere.

As illustrated in FIG. 3, since the laser microphone 16 is arranged to be spaced away from the rotating shaft 33 as a measurement target, the laser microphone 16 is easily moved along the periphery of the rotating shaft 33 as a measurement target as appropriate.

Similarly, even when there are a plurality of measurement targets, it is also possible to configure such that measurement is sequentially performed by one laser microphone 16.

Consequently, the laser microphone 16 can be used to estimate the presence or absence of a damaged machine element and a damaged part.

An example in which two bearings 32A and 32B are targets has been described above.

However, a general rotating mechanical system includes various components such as a gear box including a large number of gears in addition to a bearing, and the present embodiment can be easily applied to a system in which a failure part is not easily identified by a fixed sensor.

That is, since the laser microphone 16 of the present embodiment can perform non-contact AE measurement, the state of the system can be promptly estimated by a method of monitoring the band energy of a specific frequency (the sum of the amplitudes of frequency bands correlated with an abnormal phenomenon) or the like with respect to high-frequency acoustic vibration independent of the rotation speed.

In this case, in a case where there is a possibility that stopping the rotation of the rotating machine immediately after detecting an abnormality may further adversely affect the operation, the diagnosis system 20 outputs a control command to perform a procedure of gradually reducing the rotation, checking the part after the rotation is stopped, and the like.

In order to minimize damage to the rotating machine tool or a workpiece, a control command can be output to stop the rotating operation immediately after abnormal sound is detected.

Furthermore, in a case where high response speed is emphasized in the diagnosis system 20 that gives such a control command, it is desirable to incorporate the diagnosis system 20 into the same hardware as the high-speed signal data analysis device 19. However, in a case where a determination is made from the trend of data in the medium and long term, it is also possible to adopt a configuration in which the server or the like on a network is constructed as the diagnosis system 20 to output the control command.

Here, an arrangement example of the respective sensors will be described.

There is a problem that the signal of the contact AE sensor 11 successfully captures material breakage in both removal processing by cutting and punching processing by pressing, but is difficult to separately capture only a signal due to an abnormality in the surface and appearance of a processing target.

In addition, since the AE attenuates in a complicated mode according to the structure of a propagating solid, it is desirable to dispose the sensor near a processing point as much as possible.

However, depending on the structure of a machine, there is a possibility that sufficient signal intensity cannot be obtained because of the influence of the contact state at the interface between parts, and a lot of time may be spent for adjusting individual set-up.

On the other hand, in the laser microphone 16, a uniform attenuation rate can be expected by using the distance of the gap between a measurement target and a sensor as a standard, so that high versatility and detection reproducibility can be secured.

Consequently, it is desirable to dispose the laser microphone 16 at a distance of about 100 mm from a measurement target (in the case of the example described above, the bearings 32A and 32B) (the range in which attenuation of sound propagating in the atmosphere is sufficiently small) for use of monitoring the state of a surface property.

As an example, it is conceivable to monitor a time change in the sum of the energy amounts in a frequency band of 50 kHz with respect to the original signal.

The arrangement example and the frequency of a detection target are examples, and can be arbitrarily set as long as a desired signal can be detected at a position and a frequency.

The change in the rotation speed is not particularly described in the description, but the effect is slightly different between the case where the rotation speed is constant and the case where the rotation speed is variable.

A more specific description will be given below.

In the case where the rotation speed is constant, for example, in the case of a rotating machine that performs a continuous operation at a constant rotation speed such as a motor, a pump, or a fan, it is effective to estimate a spike occurrence frequency according to the rotation speed using a fixed vibration sensor (an acceleration sensor or the like), a contact AE sensor, or the like, and diagnose a bearing or the like by analyzing the signal of the frequency.

However, in a case where there is a combination of complex gearboxes or the like, it is necessary to consider frequencies of a plurality of elements. For this reason, know-how specific to a product is often required in setting and analysis of a sensor, and an efficient state diagnosis cannot be performed in some cases.

On the other hand, in non-contact AE measurement, the laser microphone 16 of the present embodiment can estimate the state of the system promptly by the method of monitoring the band energy of a specific frequency (the sum of the amplitudes of frequency bands correlated with an abnormal phenomenon) or the like with respect to high-frequency acoustic vibration independent of the rotation speed, and then can examine the individual machine elements.

In addition, in the case where the rotation speed is variable, for example, it is effective to periodically set a certain constant operation sequence and track the history for a target whose conditions of use or rotation speed always change, such as an industrial robot or a spindle of a machine tool.

For example, it is conceivable to perform a method of diagnosing bearing vibration in an idle state of a spindle as a no-load state where a machine tool having the spindle as a rotating member does not perform cutting.

In this case, it is possible to set a determination reference similar to that in the condition of a constant rotation speed and perform a diagnosis by the acceleration sensor, the AE sensor, and the non-contact AE measurement.

However, in the case of a wind power generator in which intervening is difficult during operation or a low-speed rotating machine with a maximum rotation speed of several rpm, it is known that the acceleration sensor cannot obtain a sufficient SN ratio and thus an accurate diagnosis cannot be performed in some cases. In addition, it is difficult for even the AE sensor to perform a practical diagnosis for a low-speed rotating machine having a complicated transmission path. However, the non-contact AE sensor like the laser microphone 16 of the present embodiment can perform a diagnosis based on the state of high-frequency sound due to a rotating operation.

According to the embodiment, it is possible to detect an abnormality of the rotating shaft or the bearing material in the rotating machine with high sensitivity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotating machine abnormality detection device comprising:
    a non-contact acoustic emission sensor arranged at a position spaced away by a predetermined distance from a measurement target acting as a rotating member or a measurement target rotatably supporting the rotating member, the non-contact acoustic emission sensor being configured to detect, within a predetermined time, acoustic emission that occurs during rotation of the measurement target or the rotating member supported by the measurement target and propagates in an atmosphere;
    an analyzer configured to perform time-frequency analysis on a detection signal of the non-contact acoustic emission sensor; and
    a diagnoser configured to detect occurrence of a rotation abnormality when a frequency component with amplitudes equal to or larger than a predetermined threshold value is present in a 50 kHz frequency band within the predetermined time, and a sum of the amplitudes of the frequency band within the predetermined time exceeds a predetermined value, based on an analysis result of the analyzer, the amplitudes equal to or larger than the predetermined threshold value not being a peak and a zero.

2. The rotating machine abnormality detection device according to claim 1, wherein
    the non-contact acoustic emission sensor is configured as a laser microphone using a principle of a Fabry-Perot interferometer.

3. A rotating machine abnormality detection method that is performed by a rotating machine abnormality detection device that includes a non-contact acoustic emission sensor, arranged at a position spaced away by a predetermined distance from a measurement target acting as a rotating member or a measurement target rotatably supporting the rotating member, configured to detect, within a predetermined time, acoustic emission that occurs during rotation of the measurement target or the rotating member supported by the measurement target and propagates in an atmosphere, the rotating machine abnormality detection method comprising:
    performing time-frequency analysis on a detection signal of the non-contact acoustic emission sensor; and
    determining when a frequency component with amplitudes equal to or larger than a predetermined threshold value is present in a 50 kHz frequency band within the predetermined time, whether or not a sum of the amplitudes of the frequency band within the predetermined time exceeds a predetermined value based on a result of the time-frequency analysis, and when the sum of the amplitudes of the frequency band within the predetermined time exceeds the predetermined value, detecting occurrence of a rotation abnormality, the amplitudes equal to or larger than the predetermined threshold value not being a peak and a zero.

* * * * *